United States Patent
Goldberg et al.

(10) Patent No.: US 7,272,240 B2
(45) Date of Patent: *Sep. 18, 2007

(54) METHOD AND APPARATUS FOR GENERATING, SENSING, AND ADJUSTING WATERMARKS

(75) Inventors: Steven Jeffrey Goldberg, Downingtown, PA (US); Debabish Purkayastha, Pottstown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/286,005

(22) Filed: Nov. 23, 2005

(65) Prior Publication Data
US 2006/0159302 A1 Jul. 20, 2006

Related U.S. Application Data

(60) Provisional application No. 60/633,222, filed on Dec. 3, 2004.

(51) Int. Cl.
*G06K 9/00* (2006.01)
(52) U.S. Cl. .................................... 382/100
(58) Field of Classification Search ................ 382/100
See application file for complete search history.

(56) References Cited

U.S. PATENT DOCUMENTS

| | | | |
|---|---|---|---|
| 5,778,304 A | 7/1998 | Grube et al. | |
| 5,959,717 A | 9/1999 | Chaum | |
| 5,960,081 A | 9/1999 | Vynne et al. | |
| 6,018,374 A | 1/2000 | Wrobleski | |
| 6,266,541 B1 | 7/2001 | Noda | |
| 6,343,213 B1 | 1/2002 | Steer et al. | |
| 6,353,778 B1 | 3/2002 | Brown | |
| 6,393,254 B1 | 5/2002 | Pousada | |
| 6,529,600 B1 | 3/2003 | Epstein et al. | |
| 6,559,883 B1 | 5/2003 | Fancher et al. | |
| 6,591,096 B2 | 7/2003 | Ezuriko | |
| 6,624,874 B2 * | 9/2003 | Revelli et al. | 352/90 |
| 6,625,455 B1 | 9/2003 | Ariga | |
| 6,662,023 B1 | 12/2003 | Helle | |

(Continued)

FOREIGN PATENT DOCUMENTS

EP 0 830 046 3/1998

(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

(Continued)

*Primary Examiner*—Bhavesh M Mehta
*Assistant Examiner*—Jordan Kuhn
(74) *Attorney, Agent, or Firm*—Volpe and Koenig, P.C.

(57) ABSTRACT

A method and apparatus for generating and adjusting a watermark in a watermarking system comprising a watermark generator and a watermark detector includes the watermark generator emitting the watermark. The watermark detector detects the watermark. The watermark detector transmits a signal to the watermark generator. The watermark generator then adjusts the generated watermark based on the signal received from the watermark detector.

33 Claims, 6 Drawing Sheets

U.S. PATENT DOCUMENTS

| | | |
|---|---|---|
| 6,687,497 B1 | 2/2004 | Parvulescu et al. |
| 6,738,495 B2 * | 5/2004 | Rhoads et al. ............... 382/100 |
| 6,738,572 B2 | 5/2004 | Hunter |
| 6,771,946 B1 | 8/2004 | Oyaski |
| 6,809,792 B1 * | 10/2004 | Tehranchi et al. ............ 352/85 |
| 6,868,229 B2 | 3/2005 | Balogh |
| 6,950,532 B1 * | 9/2005 | Schumann et al. ......... 382/100 |
| 7,043,048 B1 | 5/2006 | Ellingson |
| 7,142,691 B2 * | 11/2006 | Levy ........................... 382/100 |
| 2001/0031631 A1 | 10/2001 | Pitts |
| 2002/0039896 A1 | 4/2002 | Brown |
| 2002/0055361 A1 | 5/2002 | McDonnell et al. |
| 2002/0057823 A1 | 5/2002 | Sharma et al. |
| 2002/0058497 A1 | 5/2002 | Jeong |
| 2002/0076084 A1 * | 6/2002 | Tian et al. ................... 382/100 |
| 2002/0078357 A1 * | 6/2002 | Bruekers et al. ............. 713/176 |
| 2002/0107032 A1 | 8/2002 | Agness et al. |
| 2002/0126871 A1 | 9/2002 | Hannigan et al. |
| 2002/0186845 A1 | 12/2002 | Dutta et al. |
| 2003/0028380 A1 | 2/2003 | Freeland et al. |
| 2003/0078076 A1 | 4/2003 | Kuwajima et al. |
| 2003/0112974 A1 | 6/2003 | Levy |
| 2003/0112996 A1 * | 6/2003 | Holliman et al. ........... 382/100 |
| 2003/0122671 A1 | 7/2003 | Jespersen |
| 2003/0133573 A1 | 7/2003 | Himmel et al. |
| 2003/0169342 A1 | 9/2003 | Steinberg et al. |
| 2003/0219144 A1 * | 11/2003 | Rhoads et al. ............... 382/100 |
| 2003/0219231 A1 | 11/2003 | Vernon |
| 2004/0005078 A1 | 1/2004 | Tillotson |
| 2004/0029560 A1 | 2/2004 | Ariga |
| 2004/0073803 A1 | 4/2004 | Keramane |
| 2004/0110515 A1 | 6/2004 | Blumberg et al. |
| 2004/0155969 A1 | 8/2004 | Hayashi |
| 2004/0198306 A1 | 10/2004 | Singh et al. |
| 2004/0204021 A1 | 10/2004 | Cocita |
| 2005/0007456 A1 | 1/2005 | Lee et al. |
| 2005/0008324 A1 | 1/2005 | Balogh |
| 2005/0039020 A1 | 2/2005 | Levy |
| 2005/0043548 A1 | 2/2005 | Cates |

FOREIGN PATENT DOCUMENTS

| | | |
|---|---|---|
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 0 211 612 | 2/1927 |
| GB | 211612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 200503379 | 2/2005 |
| JP | 2005033799 | 2/2005 |
| WO | 98/34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 4/2004 |
| WO | 2004/089021 | 10/2004 |
| WO | 2004/102313 | 11/2004 |

OTHER PUBLICATIONS

Sanzgiri et al., "A Secure Routing Protocol for Ad Hoc Networks", Proceedings of the 10th IEEE International Conference on Network Protocols (ICNO '02), IEEE, 2002, pp. 1-10.

Sanzgiri et al., "A Secure Routing Protocol for Ad Hoc Networks", Proceedings of the 10th IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

* cited by examiner

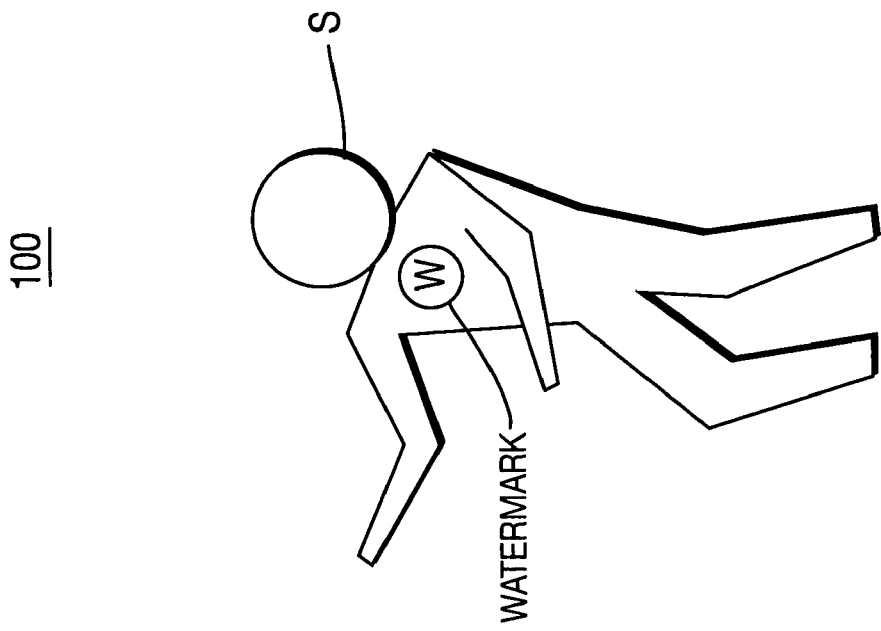
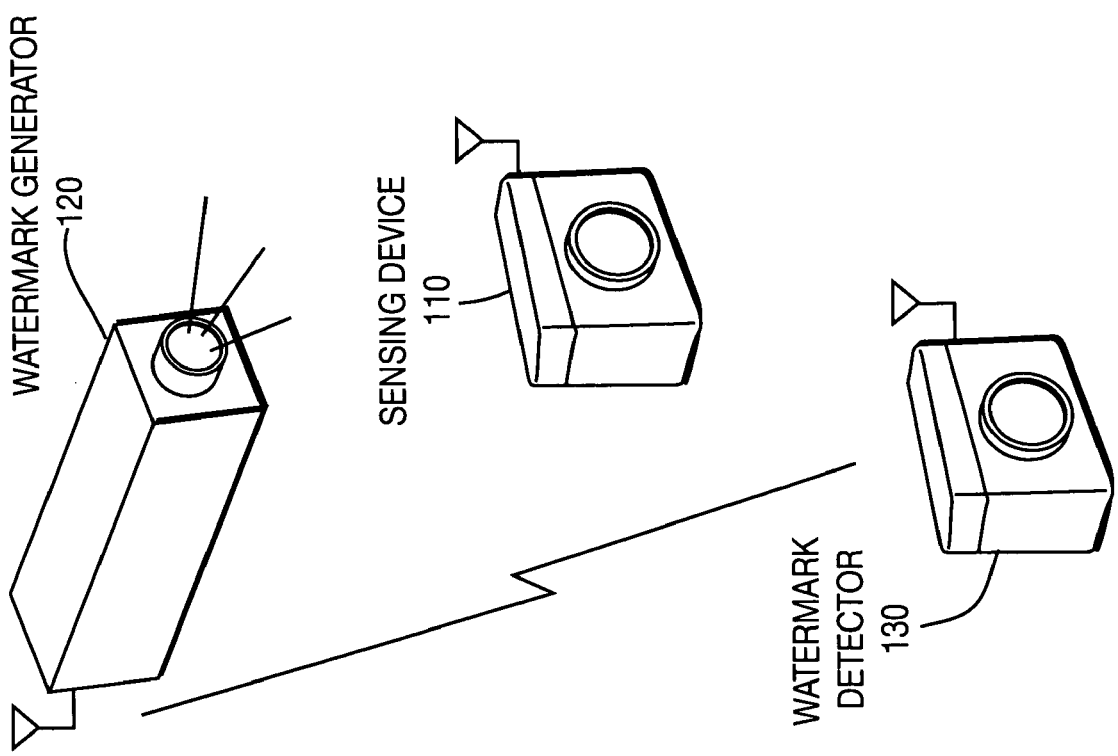
FIG. 1

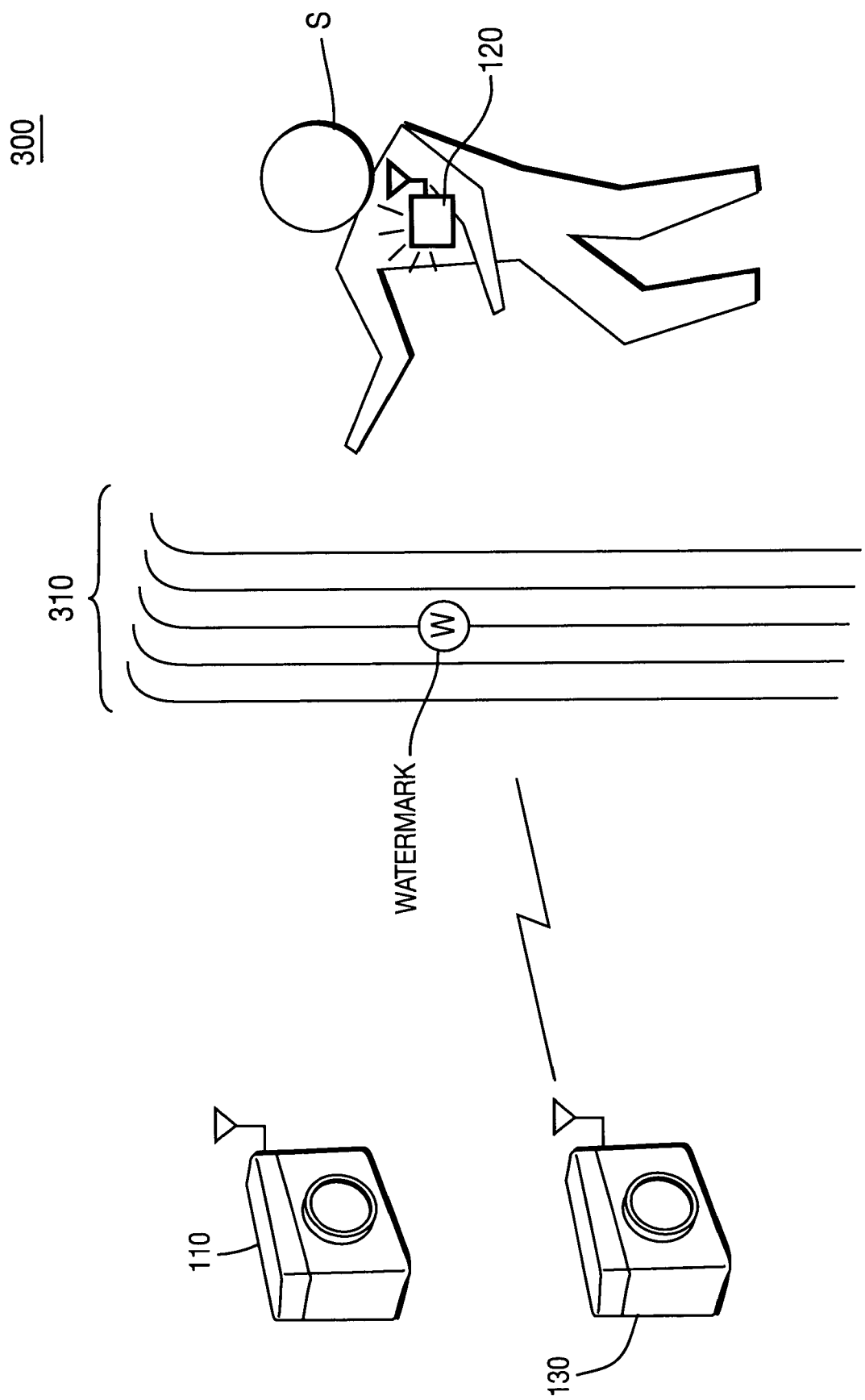

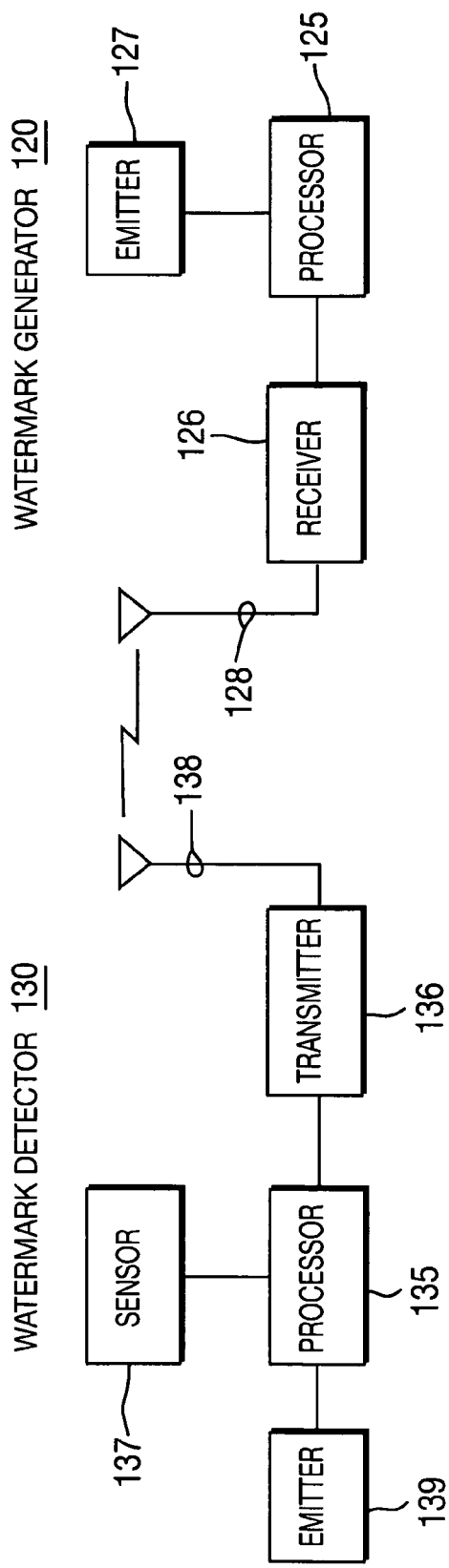
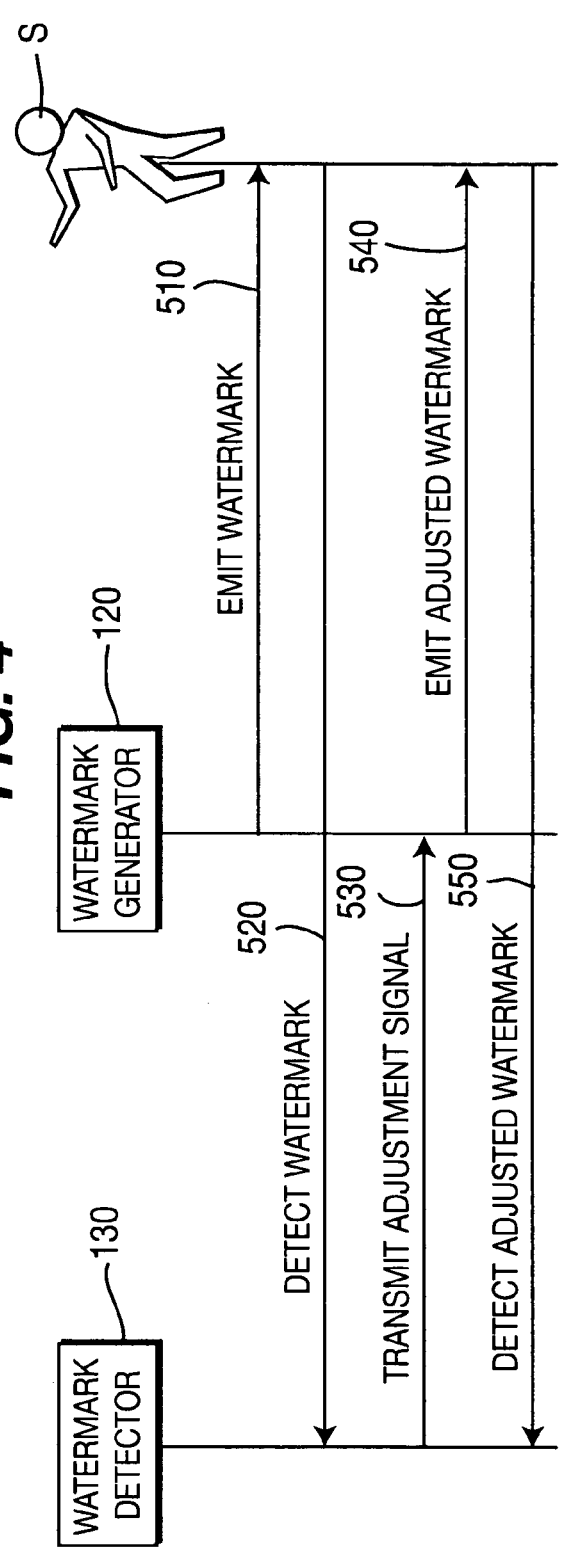

METHOD AND APPARATUS FOR GENERATING, SENSING, AND ADJUSTING WATERMARKS

CROSS REFERENCED TO RELATED APPLICATIONS

This application claims priority to U.S. Provisional Application No. 60/633,222, filed on Dec. 3, 2004, which is incorporated by reference herein as if fully set forth.

FIELD OF INVENTION

The present invention relates to sensed data. More particularly, the present invention relates to a system and method for embedding watermarks on sensed data.

BACKGROUND

With ever increasing sophistication in available technology, piracy of intellectual property has become widespread. Pirated movies on DVD or VHS often appear concurrently with the first run of the movies in theaters. Making anti-piracy efforts even more difficult, sensing devices which used to be somewhat bulky have become miniaturized, such that their physical presence often escapes detection. These sensing devices such as cameras, microphones, video recorders, and sound recorders can now be embedded in phones, personal digital assistants (PDAs), watches, or any other wireless transmit/receive unit (WTRU) that a manufacturer desires. It has therefore become easier than ever to secrete a sensing device into an event such as a play, movie, and the like.

These sensing devices can record and/or transmit images and sounds that are not authorized to be recorded or transmitted by the individual recording them. Once a scene or a sound has been captured, the sensed data may be easily distributed through a variety of channels, such as a cellular or other wireless communication network.

To combat this piracy, some businesses have attempted to regulate miniaturized sensing devices by either posting restrictions in restricted areas or by physically searching for their existence. However, these methods are often difficult to enforce, ineffective and inefficient.

Currently, watermarks are placed into images and sound recordings after the image or sound source has been captured. One example of this is computer manipulation of captured data which imparts the watermark into the data. Once imparted, these watermarks can subsequently be tracked. Similarly, audio watermarks have been imparted into sound recordings such as that which exist in a theater environment.

Although current watermarking techniques do utilize knowledge about the source data to more effectively embed a watermark into the source data, the source data has generally been a pre-existing file of digitized imagery or sounds emitted that have been captured as sensed data. Therefore, the watermarks that are currently imparted into the source data are imparted by the individuals that have sensed the data with their sensing device. Accordingly, the ability to track these imparted watermarks is hampered by the fact that the imparted watermarks can only be used to track images and sounds that the possessor of the sensed data chooses to be tracked. There does not exist a method for those who own or control the source data in a general area to ensure that a watermark is imparted upon all, or some specific object that may be recorded as data, for tracking prior to a sensing device sensing the source data.

Even having such a method of broadcasting a watermark may not be effective if the prevalent conditions of the area being protected do not allow for optimum broadcast and/or recording of the watermark. In the case of image or video sensing, for example, certain colors or patterns within the sensing area may not be optimal for the inclusion of a watermark. A watermark comprising mostly grays, for example, may not be adequately recorded in a sensing area comprising a gray background. Alternately, a multi-colored watermark intended to remain invisible to the casual observer may end up being too visible when the sensed area comprises a white background.

Therefore, if area conditions change from time to time, a watermark that at one time was optimal, may be less than optimal at another time. For instance, an audio watermark broadcast into a fairly quiet concert hall may become ineffective if the volume of the music is higher than anticipated. Currently, there exists no method or apparatus for creating a dynamic watermark that can be adjusted to the current sensing conditions.

Accordingly, it would be desirable to have a method and apparatus for imparting a watermark into source data before it is sensed such that the owner or controller of the source data can track it once it becomes sensed data. Furthermore, it would be beneficial if a method and apparatus existed that could adjust the broadcast watermarks to current sensing conditions such that the watermarks will be effectively sensed.

SUMMARY

A method and apparatus for generating and adjusting a watermark in a watermarking system comprising a watermark generator and a watermark detector includes the watermark generator emitting the watermark. The watermark detector detects the watermark. The watermark detector transmits a signal to the watermark generator. The watermark generator then adjusts the generated watermark based on the signal received from the watermark detector.

BRIEF DESCRIPTION OF THE DRAWINGS

The foregoing summary, as well as the following detailed description of the preferred embodiments of the present invention will be better understood when read with reference to the appended drawings, wherein:

FIG. 1 shows a watermarking system in accordance with the present invention;

FIG. 3 shows a watermarking system configured with a watermarking generator generating a watermark onto a screen, in accordance with the present invention;

FIG. 4 shows a block diagram of a watermark detector and a watermark generator configured to perform a method for generating and adjusting a watermark, in accordance with the present invention;

FIG. 5 shows a signal diagram of the watermark detector and the watermark generator performing a preferred method of generating and adjusting a watermark;

DETAILED DESCRIPTION OF THE PREFERRED EMBODIMENTS

Figure 2:
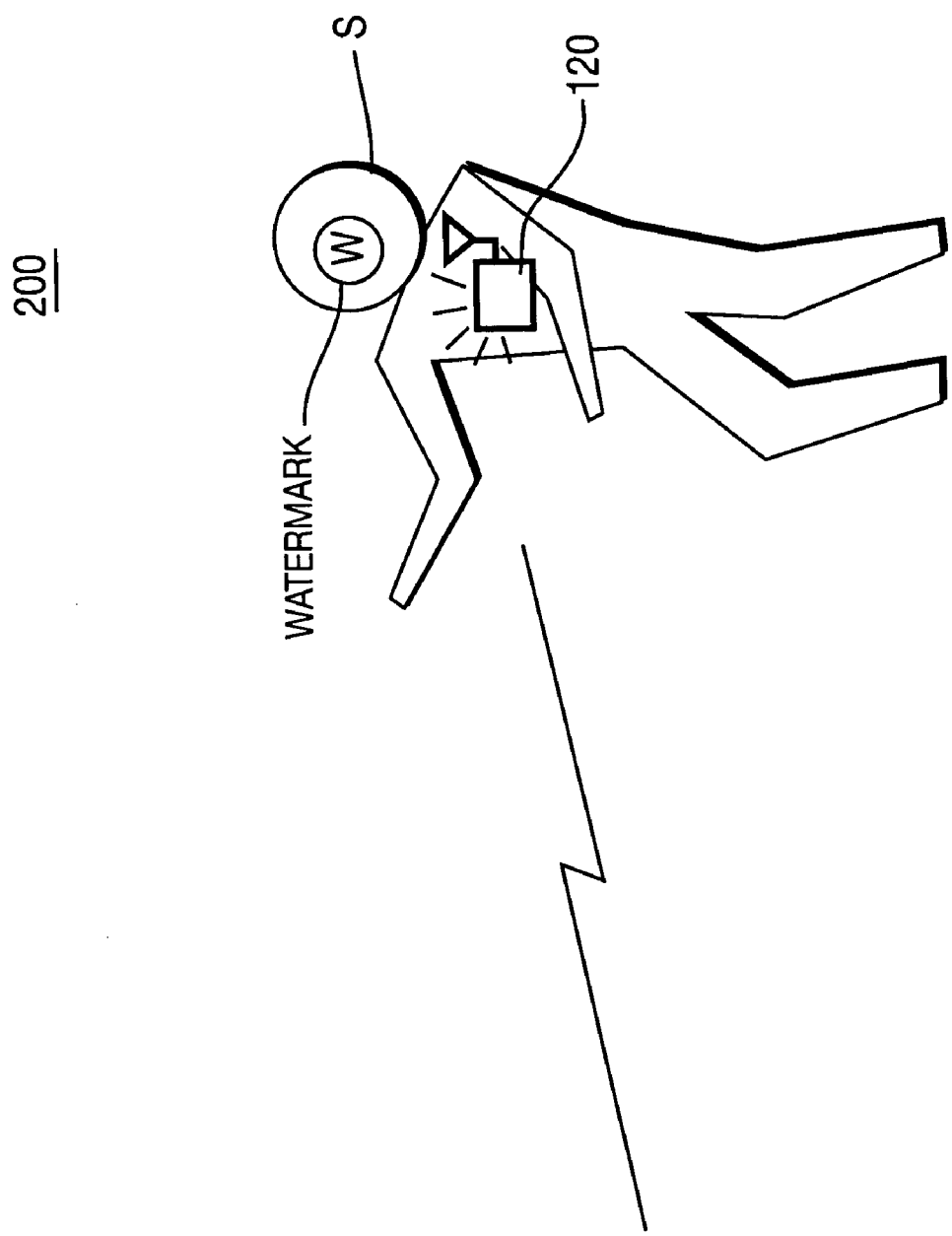
FIG. 2 shows a watermarking system configured with a watermarking generator disposed upon a subject, in accordance with the present invention.

Hereafter, the terminology "sensing device" includes, but is not limited to, a wireless transmit/receive unit (WTRU), a user equipment (UE), a computer, a mobile station, a fixed or mobile subscriber unit, a pager, a camera, a sound recorder, or any other type of device capable of sensing and recording data such as an image, video, sound, temperature, humidity, pressure, or any other type of data that can be sensed. When referred to hereafter, an access point (AP) includes a base station or a radio network controller (RNC), including but not limited to a Node-B, site controller, or any other type of interfacing device in a wireless environment.

Referring now to the drawings, wherein like reference numerals refer to similar components across the several views, and in particular to FIG. 1, a watermarking system 100 in accordance with the present invention is shown. The watermarking system 100 includes a watermark generator 120 which generates a watermark W onto a subject S, and a watermark detector 130, capable of detecting the watermark W. In a preferred embodiment of the present invention, the watermark detector 130 is in communication with the watermark generator 130. The watermarking system 100 may also include a sensing device 110 capable of detecting the watermark W. However, the sensing device 110 in a preferred embodiment of the present invention is not in communication with the watermark generator 120. For example, the sensing device 110 may be an intruder device that is not authorized to make recordings of the subject S. In a preferred embodiment of the present invention, the sensing device 110 and the watermark detector 130 are substantially similar devices to one another. That is, the watermark detector 130 is a sensing device that is communication with the watermark generator 120.

The exact method of communication between the watermark generator 120 and the watermark detector 130 is outside the scope of this invention, but may include any readily available medium such as radio frequency (RF), infrared, signal wires, power lines, telephone lines, sound and the like. Additionally, in a preferred embodiment, the generated watermark W contains metadata, which in general, describes the data in some manner. The metadata may identify the subject S, the location of the subject S, the time, or the like.

The broadcast of the watermarks W onto the subject S, or in the environment proximate to the subject S may take on a number of forms including, for visual watermarking: 1) a light source or sources variable in color spectrum and intensity bands; 2) a projector or multiple projectors capable of detailed control of images; or 3) objects likely to be included in the visual range of the recorder; and for audio watermarking: 1) a sound source or sources variable in sound frequencies and intensity bands; 2) the purposeful generation of different sounds from different sources such that the location of a recording device can be determined by decomposing the recorded sound via: a) independent component analysis—a technique that can be used for the decomposing of the signals; or b) time reversal techniques have been found to be effective for generating sounds that are heard by people in limited areas, or for generating sound that are not discernable to human differentiation; or 3) directional sound from objects likely to be in the audio cone of the recorder.

In the case of continuous recording protection, such as sound or video recording, the various methods listed above may be varied over time to improve impregnation of the watermark W, and the inclusion of more information such as time, place, and/or images.

FIG. 2 is a watermarking system 200, in accordance with an embodiment of the present invention. The watermarking system 200 includes the watermark detector 130, and a watermark generator 220 in communication with the watermark detector 130. The watermark generator 220 is disposed upon the subject S in the watermarking system 200 and generates the watermark W onto the subject S. The watermarking system 200 may also include a sensing device 110 capable of detecting the watermark W. However, the sensing device 110 in a preferred embodiment of the present invention is not in communication with the watermark generator 120. For example, the sensing device 110 may be an intruder device that is not authorized to make recordings of the subject S. Preferably, the watermark generator 120 will need to extend slightly from the rest of the subject or scene in a preferred embodiment in order to emit a watermark W onto the individual wearing the watermark generator 120. Therefore, for the subject S, the watermark generator 120 may be placed on a belt buckle or may be attached to a breast pocket or a lapel. Additionally, the watermark generator 120 may be worn around the neck. The watermark W is projected onto the subject's body and face in a preferred embodiment of the invention, although the capability to project the watermark elsewhere into the environment can be appreciated by one of ordinary skill in the art. As previously described, the projected watermark W may either be a visual or audio watermark.

FIG. 3 is a watermarking system 300, in accordance with a further embodiment of the present invention. The watermarking system 300 is substantially similar to the watermarking system 200 in that the watermark detector 130 and the watermark generator 120 are substantially similar to the watermark detector 130 and the watermark generator 120 of the watermarking system 200. The watermarking system 300 also includes a screen 310, upon which the watermark generator 220 generates the watermark W.

In the watermarking system 300, the watermark W may be projected onto the screen 310, which in a preferred embodiment is a mist screen in front of a mobile or stationary subject S. Even though the source, or watermark generator 120, of the projected watermark W can be very small, when it is projected onto the (mist) screen 310, the watermark W can be enlarged to cover a larger portion of the subject S. Thus, a person can constantly project a watermark W in front of the subject S.

For the purposes of projecting the watermark W onto the mist screen 310, the mist screen 310 should consist of a very fine vapor, in a preferred embodiment of the present invention. One way of generating such a mist screen 310 is to accumulate water to create the mist screen 310 via a dehumidifier drawing water from the surrounding air. In general, a mist screen may be generated by any method that maintains a level of particulates (small particles) in the air. These particulates, in a preferred embodiment of the present invention should not be noticeable by a casual observer.

The watermark detector 130 will sense the subject S and the screen 310 from its location between the two. Accordingly, the watermark detector 130 will need to layer the screen image on top of the scene image when extracting the watermark W. However, the watermark detector 130 may have a greatly different perspective than does the sensing device 110. To compensate for this difference, an understanding of the refraction of light through a water droplet would need to be used to transform the reflected image seen by the watermark detector 130 into a refracted image. To further enhance security, the mist screen 310 can be increased to a point where it consists of more than a fine vapor to obfuscate the image of the subject S.

FIG. 4 is a block diagram of a watermark detector 130 and a watermark generator 120 configured to generate and adjust a watermark, in accordance with the present invention.

In addition to the components normally included in a typical sensing device such as a camera or recorder, the watermark detector 130 includes a processor 135 configured to process sensed data, such as an image of the subject S with the imparted watermark W, a sensor 137 in communication with the processor 135 that senses the subject S and watermark W, a transmitter 136 in communication with the processor 136, and an antenna 138 in communication with the transmitter 136 to facilitate the transmission of wireless data. The watermark detector 130 further includes an emitter 139 capable of emitting light or sound waves.

The watermark generator 120 includes a processor 125 configured to process data received from the watermark detector 130 and to adjust a generated watermark W, an emitter 127 in communication with the processor 125, a receiver 126 in communication with the processor 125, and an antenna 128 in communication with the receiver to facilitate the reception of wireless data.

It is to be noted that, although the present invention is described with reference to the watermark generator 120 in the watermarking system 100 shown in FIG. 1, the watermarking systems 200 and 300, shown in FIGS. 2 and 3, respectively, are substantially similar. Therefore, it should be apparent to one of ordinary skill in the art that the following signal diagram and preferred method described for the watermarking system 100 can be applied to the watermarking systems 200 and 300.

In a preferred embodiment, the watermark W can be generated by the watermark generator 120 into a surrounding scene, such as the subject S, for capture by a sensing device such as sensing device 110. The watermark W is used so as to not disturb the scene and to increase the level of difficulty involved in removing the projected information from the sensed image. This approach can be used with all existing sensing devices such as cameras and video recorders. A similar approach can be utilized to watermark sounds captured by audio sensing devices.

The emitter 127 of the watermark generator 120 generates light and/or sound signals as the watermark W, in a preferred embodiment of the present invention. These signals may be in or out of the band for human perception. Variations in time, frequency, phase, and amplitude of the generated signals are based on a watermarking algorithm, which may be performed in the processor 125 of the watermark generator 120. This device will sense its surroundings and then generate a watermark based on the surroundings to achieve a desired combination of fidelity (perceptual similarity between original and watermarked versions of a scene) and robustness (ability to detect the watermark after common signal processing operations).

FIG. 5 is a signal diagram between the watermark detector 130, the watermark generator 120, and the subject S during a preferred method of generating and adjusting a watermark W. The watermark generator 120 generates a watermark (510) via the emitter 127 onto the subject S, in a preferred embodiment of the present invention. The watermark detector 130 detects the watermark W (520) via the sensor 137 and transfers it to the processor 135. It is to be noted that the detecting of the watermark W (520) includes the non-detection of the watermark W as well. That is, the sensor 137 transfers all that is sensed to the processor 135 for processing, including the presence or absence of the watermark W. The processor 135 determines whether or not the watermark W is present in the data received from the sensor 137 and whether or not the integrity of the watermark W is satisfactory.

If the watermark W is not satisfactory, such that the watermark W is not adequately detectable by the watermark detector 130, and/or the watermark W interferes with the subject S, then the processor 135 transmits an adjustment signal (530) to the watermark generator 120 via the transmitter 136 and the antenna 138 of the watermark detector 130. The receiver 126 of the watermark generator 120 receives the adjustment signal via the antenna 128, and transfers it to the processor 125 for processing.

The processor 125 adjusts the watermark W based on the adjustment signal received from the watermark detector 130, accordingly. The processor 125 then generates and adjusted watermark W (540) via the emitter 127. The adjusted watermark W is detected by the sensor 137 of the watermark detector 130 (550), and transferred to the processor 135.

Figure 6:
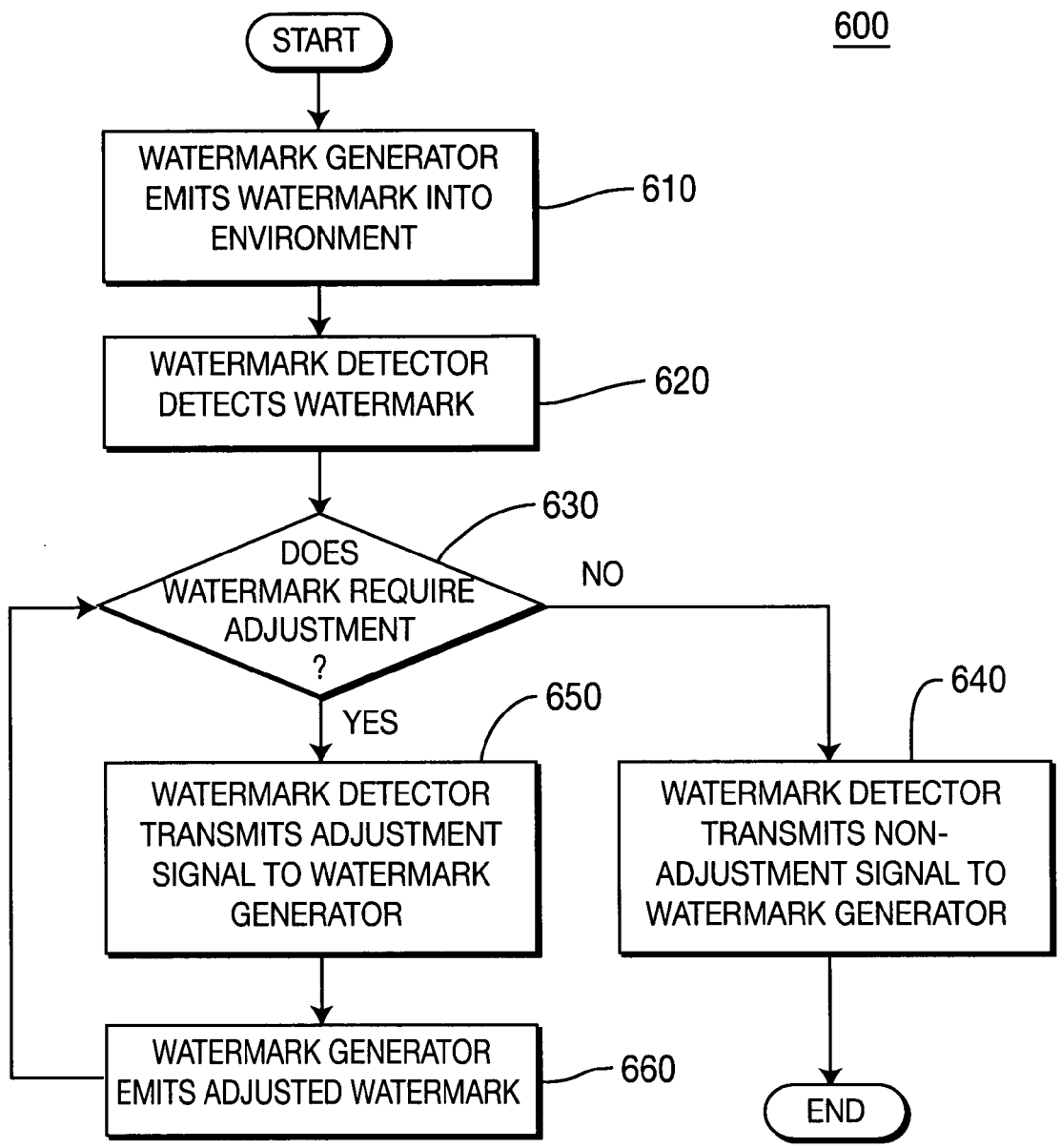
FIG. 6 is a flow diagram depicting a preferred method of generating and adjusting a watermark, in accordance with the present invention.

FIG. 6 is a flow diagram of a preferred method 600 of generating and adjusting a watermark W. In step 610, the processor 125 of the watermark generator 120 generates a watermark W through the emitter 127. In a preferred embodiment of the present invention, the watermark W is emitted onto the subject S, such as in the watermarking systems 100 and 200. However, the watermark W may be introduced into the environment surrounding the subject S, such as onto a screen 310 as in the watermarking system 300.

The embedding of the watermark W can make use of the existing watermarking techniques for embedding a watermark in a digital image that are known in the prior art. However, as the watermark W can be embedded much more effectively if the processor 125 has knowledge of the subject S and the environment surrounding the subject S, the present invention provides for detection of the emitted watermark W and the subsequent adjustment of the watermark W.

Having knowledge of the subject S and the environment allows for the magnitude of a watermark's detection strength to always be some constant greater than a detection threshold. However, embedding a watermark in a scene, such as onto the subject S or into the environment, is more difficult than embedding a watermark in a known digitized image. This is because the projected watermark may be absorbed or not evenly reflected by a scene. Also, the scene may change, causing a delay between the sensing of the scene by the watermark detector 130 and the placement of the watermark W by the watermark generator 120.

In step 620, the sensor 137 of the watermark detector 130 detects the watermark W and transfers it to the processor 135. The processor 135 of the watermark detector 130 determines whether or not the watermark W can be detected in a satisfactory fashion. Additionally, the sensor 137 of the watermark detector 130 may view the scene without the watermark W in order for the processor 135 to embed the watermark W. Then the sensor 137 can sense the scene with the watermark W in order for the processor 135 to detect or extract the watermark W from the viewed scene step 620.

If the extracted watermark W does not require any adjustment (step 630), then the processor 135 of the watermark detector 130 transmits a non-adjustment signal to the watermark generator 120 via the transmitter 136 and the antenna 138 (step 640). The receiver 126 of the watermark generator 120 receives the non-adjustment signal via the antenna 128 and forwards it to the processor 125, which then signals the emitter 127 to continue generating the watermark W as is. It may also be desirable to decrease the robustness of the watermark so that the fidelity of the subject S can be improved at this point. If the receiver 126 of the watermark generator 120 does not receive a non-adjustment signal within a pre-selected time period, the watermark generator 120 may presume there is a system malfunction and may transmit an alert that servicing is needed. This alert may be transmitted via any communication method known to one of ordinary skill in the art. In a preferred embodiment of the present invention, the alert may be transmitted to a predetermined receiver. Additionally, the watermark generator 120 may transmit a visual or audible signal into the environment being protected.

An alternate embodiment of the present invention may include that in the absence of either an adjustment signal or a non-adjustment signal, the watermark generator 120 should continue operating with the current settings.

If the extracted watermark W requires adjustment (step 630), then in an iterative manner, processor 135 transmits an adjustment signal to the watermark generator via the transmitter 136 and the antenna 138 (step 650). This adjustment signal may include instructions to increase or decrease the robustness of the watermark W, even at the expense of the fidelity of the scene.

Since the watermark detector 130 may not always be able to sense the watermark W as the sensing device 110 does, the watermark W seen by the sensing device 110 may differ from what is sensed by the watermark detector 130. If the environment is highly reflective for example. That is, light is not diffused around the point receiving the light rays. Accordingly, the watermark detector 130 may emit light onto the scene via the emitter 139 in order to judge the degree of reflectivity of different portions of the scene. If predominantly all of transmitted light is returned, then this would tend to indicate that a sensing device 110 located at a distance from the watermark detector 130 may not be adequately sensing the watermark W.

In a preferred embodiment of the present invention, light intensity should be the best determiner of visual reflectivity of a substance in the scene. However, light emitted for the purpose of determining reflectivity (rather than for creating a watermark) may visually disturb the scene. Therefore, light bands that are out of the range of human perception, such as infrared, x-ray, or the like, should be utilized to estimate reflectivity.

Additionally, the atmosphere between the scene and the sensing device 110 may alter the sensed image differently than the atmosphere between the scene and the watermark detector 130. Accordingly, the watermark detector 130 can estimate the light distorting properties of the atmosphere by emitting visible and invisible light via the emitter 139 as well as other probing signals such as sonar and radar into the atmosphere. The techniques used can be similar to those used for determining weather conditions. The processor 135 of the watermark detector 130 utilizes this information along with an estimate of the location of any sensing devices 110 to predict the noise that may be applied to the scene as it is sensed by the sensing device 110.

In step 660, the processor 125 of the watermark generator 125 adjusts the watermark W and emits the adjusted watermark. Since the watermark generator 120 may not be in the same location as the watermark detector 130, manipulation can be done to the sensed image captured by the sensor 137 of the watermark detector 130 so that it comes close to the image that would be sensed if the watermark detector 130 was in the same position as the watermark generator 120.

In some cases the watermark detector 130 and the watermark generator 120 will be collocated. However, in other cases, their physical positions will be distinct but known, for example through global positioning system (GPS) signals. That is, a GPS transceiver (not shown) may be included in both the watermark generator 120 and the watermark detector 130 to track their relative positions to one another.

In addition to the use of image manipulation based on known differences in perspective, the watermark detector 130 can, in an iterative manner, adjust the image given to the watermark generator 120 until it is perceived as desired. This can be done by the watermark detector 130 signaling the watermark generator 120 to increase the intensity of the light. If the information encoded in the watermark W changes over time, then the information rate can be slowed so that each symbol more clearly represents each encoded bit or the incorrectly received information can be retransmitted.

Attributes monitored for the purpose of adjusting broadcast watermarks include (alone or in combination) for audio watermarking: noise level; bandwidth of the various noise sources; and characteristics of discrete signal sources; and for visual watermarking: color spectrum with associated lumen levels; ambient lighting conditions; intermittent background changes (e.g. video display); and patterns.

A broadcast is changed to allow differentiation against background conditions. This may include the location of the watermark and/or the characteristics of the watermark. Such changes will also be made based on whether a watermark is optioned to produce a visible or invisible watermark. Low contrast watermarking, for instance, is suitable for invisible usage. High contrast watermarking is more robust for intentionally visible watermarking. Extreme contrast and variability is appropriate for producing a distorted image.

A personalized version of the present embodiment is also practical. A subject S user, for example, wears a watermark generator 120, which is adjusted due to a sensor which detects the surrounding prevailing environment. Another personalized approach includes having individuals, pre-selected objects or areas specifically tagged for protection. For static positioning, the area could be entered into a system graphically by indicating a monitored captured sub-area, or by designating coordinates. Movable instances can be protected by a system identifying and tracking a special target visually, or providing the protected target with a device that identifies the special target. This identification device can send out a signal such as RF or infrared, or be a visually discernable identifier via the monitor and subsequent analysis by the processor.

The identification of targets to be tracked can be triggered by the targets entering into specific areas. This may occur via visual capture and subsequent tracking, or by communicating with a device that the target is carrying.

Figure 7:
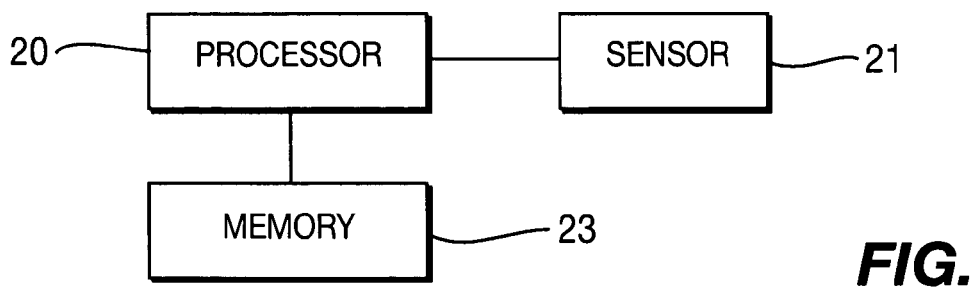
FIG. 7 shows a block diagram of a sensing device configured to process a watermark, in accordance with the present invention.

FIG. 7 is a functional block diagram of the sensing device 110 configured to process a generated watermark, in accordance with the present invention. In addition to the nominal components of a typical sensing device (a camera or recorder for example) which are not specifically shown, the sensing device 110 includes a processor 20 configured to process electronically sensed data, a sensor 21 in communication with the processor, and a memory 23 in communication with the processor 20.

Stored in the memory 23 of the sensing device 110 are watermark codes that determine whether or not the processor 20 will enable the recording functionality to operate in the sensing device 110. The processor 20 compares the watermark W to the watermark codes stored in the memory 23 to determine recording authorization of the sensed data through the sensor 21. These codes may be programmed into the memory 23 by a variety of methods. For example, security personnel in cooperation with the subject environment may program the codes into the sensing device 110, or the sensing device 110 may be able to download enabling codes. For additional security, the enabling code can be generated dynamically instead of a pre-determined programmed code.

Figure 8:
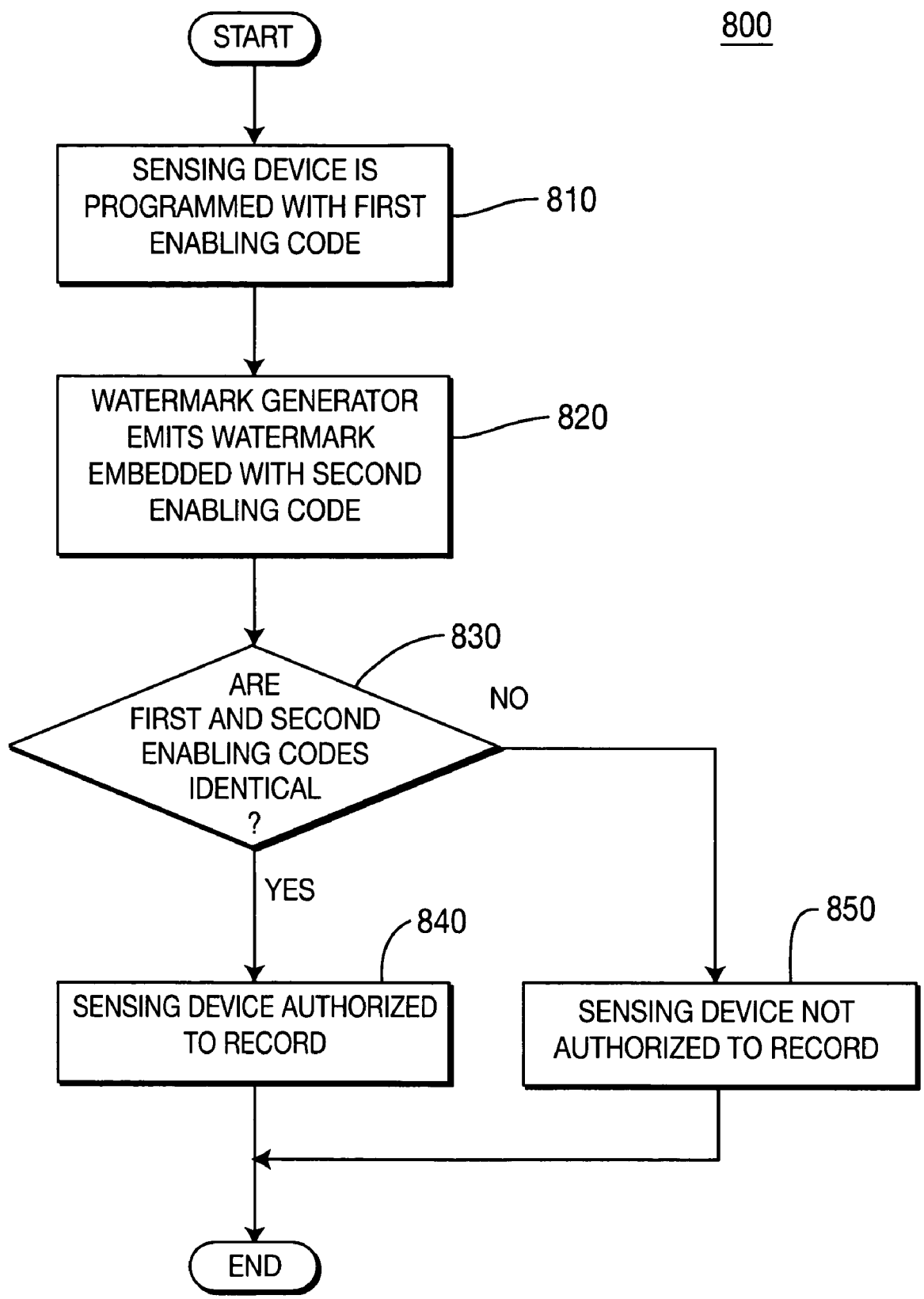
FIG. 8 is a flow diagram depicting a preferred method of enabling the recording of sensed data, in accordance with the present invention.

FIG. 8 is a flow diagram of a preferred method of enabling recording 800, in accordance with the present invention. In step 810, the sensing device 110 is programmed with the enabling code to allow the recording of the subject S.

The watermark generator 120 emits the watermark W (step 820). Encoded in the watermark W is the enabling code to allow the sensing device 110 to record the subject S.

The sensor 21 of the sensing device 110 senses the watermark W along with the enabling code and transmits the data to the processor 20. The processor 20 searches the memory 23 to determine if the emitted enabling code matches the enabling code programmed into the memory 23 (step 830).

If the emitted enabling code matches the programmed enabling code, then processor 20 permits the recording of the subject S (step 840). Otherwise, recording is not allowed (step 850).

In a preferred embodiment of the present invention, the enabling code permits the recording of the subject S. Alternatively, however, the enabling code may be split into two parts, the first part may be information (such as a key) as to how the second part may be decoded.

Although the features and elements of the present invention are described in the preferred embodiments in particular combinations, each feature or element can be used alone without the other features and elements of the preferred embodiments or in various combinations with or without other features and elements of the present invention. For example, in a preferred embodiment of the present invention, the method may be performed by an application running on the processor of either the watermark detector or the watermark generator, however, it is to be appreciated by one of ordinary skill in the art that the method may be implemented in additional ways, such as through the use of an integrated circuit (IC) configured to perform a preferred method of generating and adjusting the watermark. It is also to be appreciated by one of ordinary skill in the art, that a method of extracting an imparted watermark is required to determine if a watermark exists in any data.

What is claimed is:

1. A method for generating and adjusting a watermark in a watermarking system comprising a watermark generator and a watermark detector, the method comprising:

the watermark generator emitting the watermark into an environment;

the watermark detector detecting the watermark;

the watermark detector transmitting a signal to the watermark generator; and the watermark generator adjusting the generated watermark based on the signal received from the watermark detector.

2. The method of claim 1, wherein the watermark generator emits a watermark onto a pre-selected object or area.

3. The method of claim 2, wherein the watermark generator emits a watermark onto the pre-selected object when the pre-selected object enters the pre-selected area, tracks the pre-selected object as the pre-selected object moves within the pre-selected area, and ceases to emit the watermark when the pre-selected object exits the pre-selected area.

4. The method of claim 1, wherein the watermark generator emits the watermark upon a subject.

5. The method of claim 4, wherein the watermark generator is disposed upon the subject.

6. The method of claim 1, wherein the watermark generator emits the watermark onto a screen.

7. The method of claim 6, wherein the screen is a mist screen.

8. The method of claim 1, wherein the watermark detector and the watermark generator are collocated.

9. The method of claim 1, wherein the watermark detector and the watermark generator are located distant to one another.

10. The method of claim 9, wherein the watermark detector are in wireless communication with one another.

11. The method of claim 10, further comprising the step of the watermark detector sensing the environment without the presence of the watermark.

12. The method of claim 11, wherein the watermark detector determines no adjustment is necessary in the generated watermark.

13. The method of claim 11, wherein the watermark detector determines an adjustment for the watermark.

14. The method of claim 13, further comprising a sensing device, capable of sensing the environment.

15. The method of claim 14, wherein the watermark detector emits a light, into the environment and senses the reflected light.

16. The method of claim 15, wherein the watermark detector estimates the location of the sensing device.

17. The method of claim 16, wherein the watermark detector determines the adjustment to the watermark based upon the estimate of the location of the sensing device, and the reflected light.

18. The method of claim 13, wherein the watermark detector transmits an adjustment signal to the watermark generator.

19. The method of claim 18, wherein the watermark generator adjusts the watermark based on the adjustment signal received from the watermark detector.

20. The method of claim 19, wherein the adjustment includes increasing or decreasing the intensity of the emitted watermark.

21. The method of claim 1, further comprising the watermark detector detecting the adjusted watermark.

22. The method of claim 1, wherein the watermark detector and the watermark generator are a single entity.

23. The method of claim 1, wherein the watermark contains metadata about a subject.

24. The method of claim 1, wherein the watermark generator emits an audible watermark.

25. The method of claim 1, wherein the watermark generator emits a visual watermark.

26. In a watermarking system comprising a watermark generator generating a watermark into an environment and a watermark detector detecting the watermark, the watermark detector comprising:
- a transmitter;
- a sensor; and
- a processor in communication with the transmitter and the sensor. wherein an application runs on the processor, the sensor senses the watermark, the processor determines an adjustment for the watermark, and the processor transmits an adjustment signal to the watermark generator through the transmitter.

27. The watermark detector of claim 26, wherein the watermark detector further comprises an emitter, wherein the emitter emits a light, the sensor senses the light and forwards the sensed light to the processor, and the processor determines the adjustment signal based on the sensed light and watermark.

28. The watermark detector of claim 26, further comprising an antenna in communication with the transmitter.

29. The watermark detector of claim 26, wherein the watermark detector and the watermark generator further comprise a global position system (GPS), wherein the GPS tracks the relative location of the watermark generator and the watermark detector to one another.

30. In a watermarking system comprising a watermark generator generating a watermark into an environment and a watermark detector detecting the watermark. the watermark detector including an integrated circuit (IC) comprising:
- a transmitter;
- a sensor; and
- a processor in communication with the transmitter and the sensor, wherein an application runs on the processor, the sensor senses the watermark, the processor determines an adjustment for the watermark, and the processor transmits an adjustment signal to the watermark generator through the transmitter.

31. The IC of claim 30, wherein the IC further comprises an emitter, wherein the emitter emits a light, the sensor senses the light and forwards the sensed light to the processor, and the processor determines the adjustment signal based on the sensed light and watermark.

32. The IC of claim 30, further comprising an antenna in detector to one another.

33. the IC of claim 30, wherein the watermark detector and the watermark generator further comprise a global position system (GPS), wherein the GPS tracks the relative location of the watermark generator and the watermark detector to one another.

* * * * *

UNITED STATES PATENT AND TRADEMARK OFFICE
CERTIFICATE OF CORRECTION

| | | |
|---|---|---|
| PATENT NO. | : 7,272,240 B2 | |
| APPLICATION NO. | : 11/286005 | |
| DATED | : September 18, 2007 | |
| INVENTOR(S) | : Goldberg et al. | |

It is certified that error appears in the above-identified patent and that said Letters Patent is hereby corrected as shown below:

ON THE TITLE PAGE

At item (56), U.S. PATENT DOCUMENTS, page 1, right column, after "6,393,254", insert --6,492,897  12/2002  Mowery et al.--.

At item (56), FOREIGN PATENT DOCUMENTS, page 1, right column, before "EP  0 830 046  3/1998", insert --EP  0 505 266  3/1992--.

At item (56), U.S. PATENT DOCUMENTS, page 2, left column, after "7,043,048", insert --7,139,014  11/2006  Kim et al.--.

At item (56), U.S. PATENT DOCUMENTS, page 2, left column, after "7,142,691", insert --7,158,776  1/2007  Estes et al.--.

At item (56), U.S. PATENT DOCUMENTS, page 2, left column, after "2001/0031631", insert
--2001/0036821  11/2001  Gainsboro et al.
  2002/0019223  2/2002  Lee et al.--.

At item (56), U.S. PATENT DOCUMENTS, page 2, left column, after "2002/0039896", insert --2002/0044659  4/2002  Ohta--.

At item (56), U.S. PATENT DOCUMENTS, page 2, left column, after "2002/0126871", insert --2002/0168069  11/2002  Tehranchi et al.--.

At item (56), U.S. PATENT DOCUMENTS, page 2, left column, after "2002/0186845", insert --2003/0012548  1/2003  Levy et al.--.

At item (56), U.S. PATENT DOCUMENTS, page 2, left column, after "2004/0005078", insert
--2004/0025024  2/2004  Hirai
  2004/0029552  2/2004  Miki et al.--.

At item (56), U.S. PATENT DOCUMENTS, page 2, left column, after "2004/0073803", insert --2004/0101282  5/2004  Kuroda et al.--.

At item (56), U.S. PATENT DOCUMENTS, page 2, left column, after "2004/0155969", insert
--2004/0125125  7/2004  Levy
  2004/0190716  9/2004  Nelson--.

UNITED STATES PATENT AND TRADEMARK OFFICE
CERTIFICATE OF CORRECTION

| | |
|---|---|
| PATENT NO. | : 7,272,240 B2 |
| APPLICATION NO. | : 11/286005 |
| DATED | : September 18, 2007 |
| INVENTOR(S) | : Goldberg et al. |

It is certified that error appears in the above-identified patent and that said Letters Patent is hereby corrected as shown below:

At item (56), FOREIGN PATENT DOCUMENTS, page 2, right column, line 1, delete "GB  0 211 612  2/1927".

At item (56), FOREIGN PATENT DOCUMENTS, page 2, right column, line 27, delete "JP  200503379  2/2005".

At item (56), FOREIGN PATENT DOCUMENTS, page 2, right column, line 35, delete "WO  2004/089021  4/2004".

At item (56), OTHER PUBLICATIONS, page 2, right column, lines 1, 2, & 3, delete "Sanzgiri et al. … pp. 1-10".

At column 3, line 53, after the words "of the", delete "watermarks" and insert therefor --watermark's--.

At column 4, line 1, after the word "generating", delete "sound" and insert therefor --sounds--.

At column 6, line 24, after the word "generates", delete "and" and insert therefor --an--.

At column 8, line 2, before the word "adjusts", delete "125" and insert therefor --120--.

At claim 10, column 10, line 28, after the word "detector", insert --and the watermark generator--.

At claim 15, column 10, line 40, after the word "light", delete ",".

At claim 17, column 10, line 46, after the word "device", delete ",".

At claim 26, column 11, line 8, after the word "sensor", delete "." and insert therefor --,--.

At claim 32, column 12, line 20, delete "detector to one another." and insert therefor --communication with the transmitter.--.

UNITED STATES PATENT AND TRADEMARK OFFICE
CERTIFICATE OF CORRECTION

PATENT NO. : 7,272,240 B2
APPLICATION NO. : 11/286005
DATED : September 18, 2007
INVENTOR(S) : Goldberg et al.

It is certified that error appears in the above-identified patent and that said Letters Patent is hereby corrected as shown below:

At claim 33, column 12, line 21, before "IC", delete "the" and insert therefor --The--.

Signed and Sealed this

Third Day of June, 2008

JON W. DUDAS
*Director of the United States Patent and Trademark Office*